United States Patent
Jijumon et al.

(10) Patent No.: US 11,818,056 B2
(45) Date of Patent: Nov. 14, 2023

(54) DYNAMIC COMPUTING RESOURCE MANAGEMENT

(71) Applicant: Charter Communications Operating, LLC, St. Louis, MO (US)

(72) Inventors: Abeson Jijumon, Parker, CO (US); George P. Celvi, Bailey, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/357,717

(22) Filed: Jun. 24, 2021

(65) Prior Publication Data
US 2022/0417173 A1 Dec. 29, 2022

(51) Int. Cl.
*H04L 47/70* (2022.01)
*H04L 43/0852* (2022.01)
*H04L 41/14* (2022.01)
*H04L 47/283* (2022.01)

(52) U.S. Cl.
CPC ............ *H04L 47/82* (2013.01); *H04L 41/145* (2013.01); *H04L 43/0852* (2013.01); *H04L 47/283* (2013.01)

(58) Field of Classification Search
CPC ... H04L 47/82; H04L 43/0852; H04L 47/283; H04L 41/0897; H04L 41/147
See application file for complete search history.

(56) References Cited

U.S. PATENT DOCUMENTS

| | | | |
|---|---|---|---|
| 9,412,075 B2 | 8/2016 | Padala et al. | |
| 9,571,347 B2 | 2/2017 | Siddiqui et al. | |
| 9,729,401 B2 | 8/2017 | Gupta et al. | |
| 10,091,070 B2 | 10/2018 | Chopra et al. | |
| 10,419,530 B2 | 9/2019 | Halpern et al. | |
| 2009/0157870 A1* | 6/2009 | Nakadai | H04L 67/1008 709/224 |
| 2013/0179144 A1* | 7/2013 | Lu | G06F 11/3433 703/20 |
| 2014/0337837 A1* | 11/2014 | Padala | G06F 9/50 718/1 |
| 2021/0184942 A1* | 6/2021 | Tootaghaj | H04L 41/16 |

* cited by examiner

*Primary Examiner* — Abdulkader M Alriyashi
(74) *Attorney, Agent, or Firm* — THE MARBURY LAW GROUP, PLLC

(57) ABSTRACT

Various embodiments include network computing devices and methods for computing resource management. A processor of a network computing device may determine a latency metric and a transaction volume metric for a network application, determine an autoscaling cost based on the determined latency metric and transaction volume metric, allocate to the network application computing resources based on the determined autoscaling cost, and provide the allocated computing resources to the network application.

24 Claims, 10 Drawing Sheets

DYNAMIC COMPUTING RESOURCE MANAGEMENT

BACKGROUND

In network-based (sometimes referred to as "cloud") computing, "scaling" refers to adding or removing network computing resources such as processing devices, memory storage, and/or network services allocated to performing a service or task. The ability of a computing device or system to perform a computing task or transaction for an application is related to the resources allocated and the transaction volume of the application. Conventionally, applications are manually allocated to virtualized computing resources based on a human analysis of complex statistics of past application performance. Latency typically increases with an increase in transaction volume, and if insufficient computing resources are available to fulfill a particular transaction volume (for example, due to unanticipated requests or an unanticipated request volume). Latency may increase beyond an acceptable performance range.

SUMMARY

Various aspects disclosed herein include methods that may be implemented on a processor of a network computing device for computing resource management. Various aspects may include determining a latency metric and a transaction volume metric for a network application, determining an autoscaling cost based on the determined latency metric and transaction volume metric, allocating computing resources to the network application based on the determined autoscaling cost, and providing the allocated computing resources to the network application.

Some aspects may include applying a smoothing filter to the latency metric, in which determining an autoscaling cost based on the determined latency metric and transaction volume metric comprises determining the autoscaling cost based on the filtered latency metric. In some aspects, determining an autoscaling cost based on the determined latency metric and transaction volume metric may include applying the determined latency metric and transaction volume metric to an autoscaling model that provides as an output the autoscaling cost.

In some aspects, determining an autoscaling cost based on the determined latency metric and transaction volume metric may include receiving as an output from an autoscaling model a delta value based on the determined latency metric and transaction volume metric, and determining the autoscaling cost based on the output delta value. In some aspects, the delta value may represent a change in the latency metric over time. In some aspects, providing the allocated computing resources to the network application may include determining a scale factor based on the determined autoscaling cost, and calling a scaling function to provide the allocated computing resources to the network application based on the determined scale factor.

Some aspects may include, during a training operation, applying a linear function of a plurality of latency metrics and transaction volumes to an autoscaling model to train the autoscaling model to provide the autoscaling cost as an output. In such aspects, applying a linear function of a plurality of latency metrics and transaction volumes to an autoscaling model may include applying a smoothing filter to the plurality of latency metrics and transaction volumes, and applying a linear function of the filtered plurality of latency metrics and transaction volumes to the autoscaling model to train the autoscaling model to provide the autoscaling cost as an output.

Various aspects further include a network computing device having a processor configured with processor executable instructions to perform operations of any of the methods summarized above. Various aspects further include a network processing device for use in a computing device and configured to perform operations of any of the methods summarized above. Various aspects include a network computing device having means for performing functions of any of the methods summarized above. Various aspects include a non-transitory processor-readable storage medium having stored thereon processor-executable instructions configured to cause a processor of a network computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
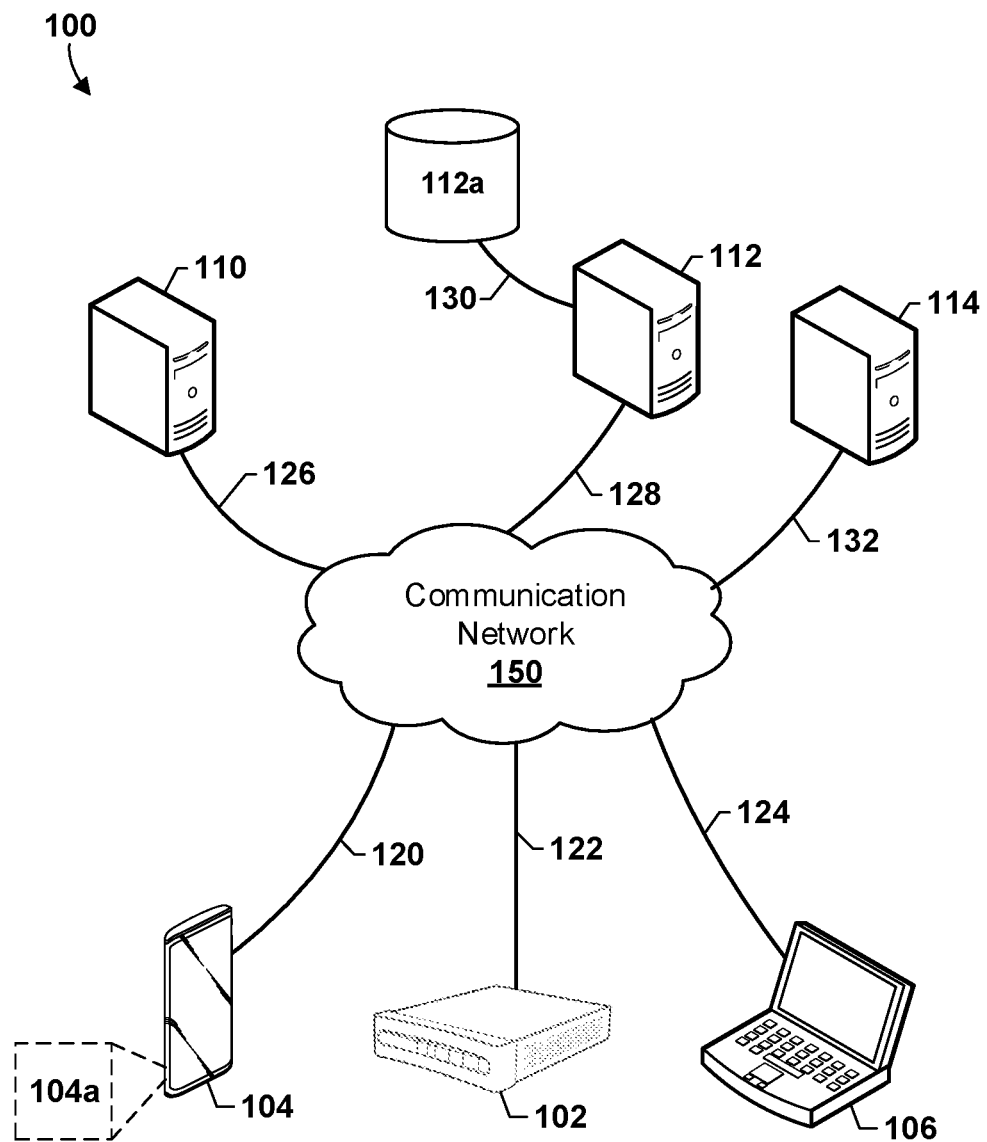
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

Conventionally, virtualized computing resources are manually allocated to applications based on a human analysis of complex statistics of past application performance. Unanticipated demand or requests for computing resources may increase transaction latency beyond an acceptable performance range for an application or service. For example, the release of a new movie or television show may cause numerous requests to view, download, or stream, a media file or resource, information about the new movie or television show, and the like. As another example, any of a variety of events may lead to numerous requests for resources that provide news, especially multimedia news presentations, such as a major world event, natural calamity, global pandemic, and so forth; actions or statements of a political leader, celebrity, or sports figure; commentary and social media resources regarding any of the foregoing, and so forth.

Various embodiments enable a network computing device to dynamically scale cloud-based computing resources and network infrastructure based on load requirements for network applications and services. Various embodiments improve the operation of network-based computing by enabling rapidly responsive adjustment (reallocation, scaling) of computing resources allocated to a network application or service, enabling such network application or service to perform (e.g., provide an output, a service, a computation, and the like) within a threshold service level.

In various embodiments, a network computing device may determine a latency metric and a transaction volume metric for a network application, determine an autoscaling cost based on the determined latency metric and transaction volume metric, allocate to the network application computing resources based on the determined autoscaling cost, and provide the allocated computing resources to the network application. In some embodiments, computing resources may be allocated as a group or set of computing resources (e.g., a containerized set of resources, a "pod," or another suitable grouping) that may include processing resources (e.g., one or more processors such as CPUs), memory, and other supporting computing infrastructure.

As used herein, "scale" and "scaling" may include horizontal scaling and or vertical scaling. Horizontal scaling includes adjusting a number or amount of computing resources allocated to a service or application. Vertical scaling includes adjusting computing power of a particular computing resource or computing resources, such as adjusting a number of pods allocated to a service or application.

In some embodiments, the network computing device may apply a smoothing filter to the latency metric, and may determine the autoscaling cost based on the filtered latency metric. In some embodiments, a machine learning based autoscaling model may be configured to scale software application instances and allocated computing resources. In some embodiments, the autoscaling model may analyze and map various metrics to generate a two dimensional data set representing the latency metric and the transaction volume metric. In some embodiments, the network computing device may apply the determined latency metric of the transaction volume metric to the autoscaling model, which may provide as an output the autoscaling cost. In various embodiments, the number of metrics that may be applied to the machine learning model is not limited to two metrics, or to the latency metric and the transaction volume metric, or to any particular metrics or number of metrics. In some embodiments, the network computing device may apply one or more additional metrics to the autoscaling model, such as one or more metrics that are coincident with respect to the two dimensional data set unit of time, for example, CPU utilization, memory cost, or another suitable metric. In some embodiments, the application of additional metrics may enable the autoscaling model to provide a more granular or accurate output. In some embodiments, the application of such additional metrics may influence (e.g., increase or decrease) the slope of the scaled output for autoscaling. In some embodiments, the autoscaling model may be implemented in TensorFlow or another suitable platform.

In some embodiments, the network computing device may receive, as an output from the autoscaling model, a delta value that is based on the determined latency metric and transaction volume metric. Based on the output delta value, the network computing device may determine the autoscaling cost. In some embodiments, the delta value represents a change in the latency metric over time.

In some embodiments, the network processing device may determine a scale factor based on the determined autoscaling cost. In such embodiments, the network processing device may call a scaling function to provide the allocated computing resources to the network application based on the determined scale factor.

In some embodiments, during a training operation of the autoscaling model, a linear function of a plurality of latency metrics and transaction volumes may be applied to the autoscaling model to train the autoscaling model to provide the autoscaling cost as an output. In some embodiments, applying a linear function of a plurality of latency metrics and transaction volumes to an autoscaling model may include applying a smoothing filter to the plurality of latency metrics and transaction volumes, and applying a linear function of the filtered plurality of latency metrics and transaction volumes to the autoscaling model to train the autoscaling model to provide the autoscaling cost as an output.

Various embodiments improve the operation of a network computing system by enabling dynamic infrastructure adjustments that are responsive to the demands of a network application or service for computing resources. Various embodiments improve the operation of a network computing system by improving the performance of network applications and services by dynamically allocating computing resources, and in this manner enabling such network applications and services to provide performance within a threshold performance requirement.

Various embodiments may be implemented within a variety of communication systems 100, an example of which is illustrated in FIG. 1. With reference to FIG. 1, the communication system 100 may include various user equipment (UE) such as a set top box (STB) 102, a mobile device 104, a computer 106. In addition, the communication system 100 may include network elements such as a computing devices 110, 112, and 114, and a communication network 150. The STB 102, the mobile device 104, the computer 106, and the computing devices 110, 112, and 114 may communicate with the communication network 150 via a respective wired or wireless communication link 120, 122, 124, 126, 128 and 132. The computing device 112 may communicate with a data store 112a via a wired or wireless communication link 130.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like.

The computing device 110 may be configured to perform operations related to management of computing resources. Such computing resources may be provided, for example, by the computing devices 112 and 114. In some embodiments, execution of a task or service may require data or information stored in the data store 112a.

The STB 102, the mobile device 104, and the computer 106 may each include a processor or processing device that may execute one or more client applications (e.g., client application 104a). The client application 104a may send (via the mobile device 104) a call to the computing device 114. The call may include a request for information from, for example, a target system executing on, or available through, the computing device 112.

The communication network 150 may support wired and/or wireless communication among the STB 102, the mobile device 104, the computer 106, and the computing devices 110, 112, and 114. The communication network 150 may include one or more additional network elements, such as servers and other similar devices (not illustrated). The communication system 100 may include additional network elements to facilitate communication among the STB 102, the mobile device 104, the computer 106, and the computing devices 110, 112, and 114. The communication links 120, 122, 124, 126, 128, 130 and 132 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128, 130 and 132 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128, 130 and 132 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoW-PAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
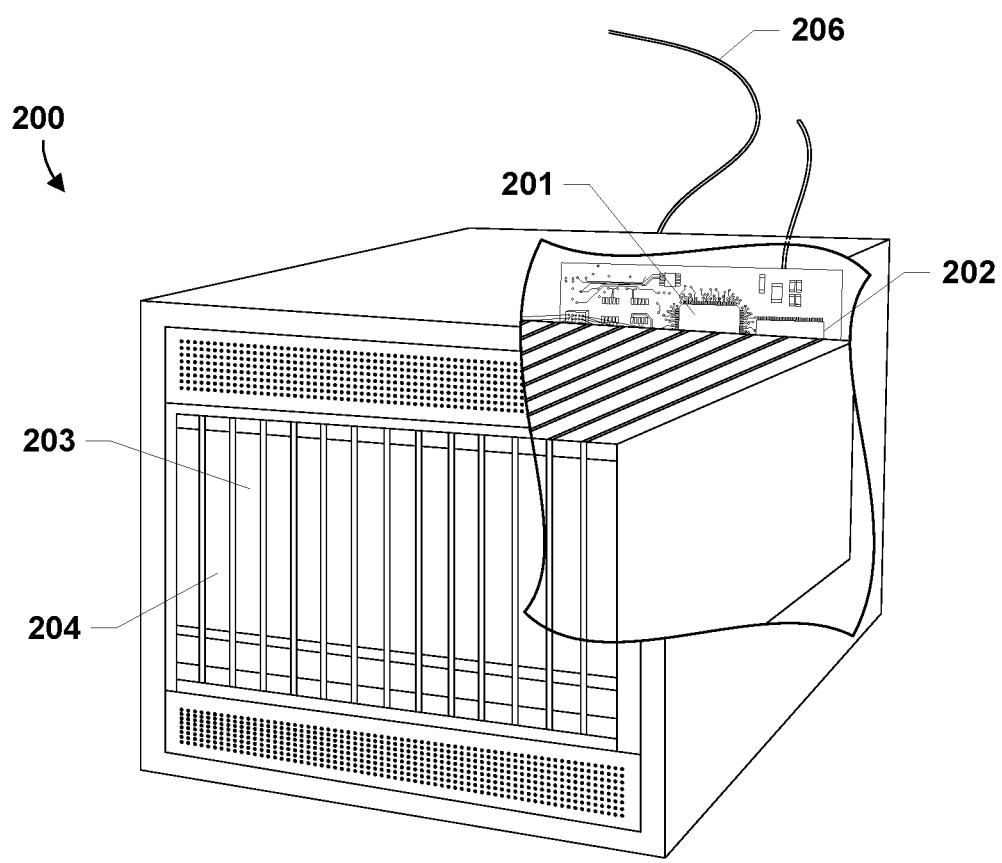
FIG. 2 is a component block diagram illustrating components of a network element suitable for implementing various embodiments.

Various embodiments may use a computing device as a server, router, or another suitable element of a communication network. Such network elements may typically include at least the components illustrated in FIG. 2, which illustrates an example network computing device 200. With reference to FIGS. 1 and 2, the network computing device 200 (e.g., the computing devices 110, 112, and 114) may include a processor 201 coupled to volatile memory 202 and a large capacity nonvolatile memory, such as a disk drive 203. The network computing device 200 may also include a peripheral memory access device such as a floppy disc drive, compact disc (CD) or digital video disc (DVD) drive 204 coupled to the processor 201. The network computing device 200 may also include network access ports 206 (or interfaces) coupled to the processor 201 for establishing data connections with a network, such as the Internet and/or a local area network coupled to other system computers and servers. Similarly, the network computing device 200 may include additional access ports, such as USB, Firewire, Thunderbolt, and the like for coupling to peripherals, external memory, or other devices.

Figure 3:
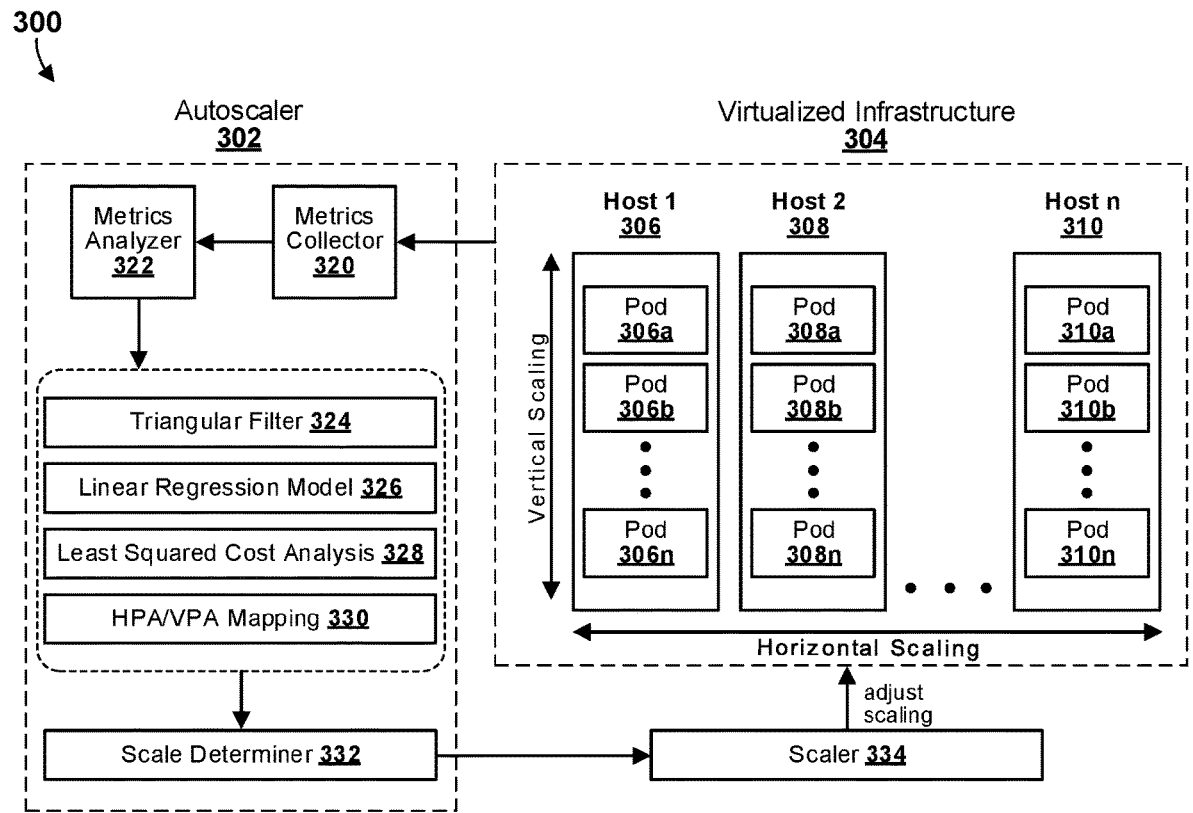
FIG. 3 is a component block diagram illustrating components of an autoscaler architecture suitable for implementing various embodiments.

FIG. 3 is a component block diagram illustrating components of an autoscaler architecture 300 suitable for implementing various embodiments. With reference to FIGS. 1-3, the autoscaler architecture 300 may include an autoscaler 302 and virtualized infrastructure 304 that may be implemented in one or more processors of one or more computing devices (e.g., the computing devices 110, 112, 114, 200). In various embodiments, the autoscaler 302 and the virtualized infrastructure 304 may be implemented in software, hardware, or a combination of software and hardware.

The virtualized infrastructure may include a plurality of hosts 306, 308, and 310 (e.g., network computing device 200). Each host may include a plurality of pods. For example, host 1 (306) may include pods 306a, 306b, . . . 306n, host 2 (308) may include pods 308a, 308b, . . . 308n, and so forth. The hosts 306, 308, 310 and the pods are referred to collectively as "computing resources." The virtualized infrastructure 304 may be scaled vertically, horizontally, or both vertically and horizontally. Vertical scaling may include adding or subtracting pods of a host allocated to a computing task or service. Horizontal scaling may include adding or subtracting hosts allocated to a computing task or service (such as a network application).

The autoscaler 302 may include a metrics collector 320, a metrics analyzer 322, analytical elements including a triangular filter 324, a linear regression model 326, a least squared cost analysis module 328, and a horizontal pod autoscaling (HPA) and/or vertical pod autoscaling (VPA) mapping module 330. The autoscaler 302 may also include a scale determiner 332. In various embodiments, the autoscaler 302 may receive or collect a plurality of metrics from the virtualized infrastructure 304 via the metrics collector 320, and may analyze the collected metrics via the metrics analyzer 322.

In some embodiments, the triangular filter 324 may be configured to reduce an effect on latency metric(s) that may be caused by network and compute resources not relating to transaction volume. In some embodiments, the triangular filter 324 may include a smoothing filter. In some embodiments, the smoothing filter may be configured to provide a weighted moving average filter function, which may be expressed as Smoothed Latency$_m$=n*(p(m−1)+2n*p(m)+n*p(m−1))/(n+2n+n)), in which p represents actual latency, m represents an index or position of the latency metrics, and n represents a weight value. In some embodiments, the value of the weight value n may 1, in which case the smoothing filter may be represented as Smoothed Latency$_m$=(p$_{m-1}$+2*p$_{(m)}$+p$_{(m+1)}$)/4.

In some embodiments, the linear regression model 326 may be used for training a machine learning model (e.g., in TensorFlow) that may be used to generate a training model. In some embodiments, the least squared cost analysis module 328 may be configured to determine the scaling cost by forming a best fit line to determine a cost deviation (e.g., by applying a machine learning algorithm) In some embodiments, the HPA/VPA mapping module 330 may be configured to maintain a mapping of scaling cost and pods (or other computing resource grouping or other computing resources). In some embodiments, the HPA/VPA mapping module 330 may provide as an output a number of pods (or other computing resource grouping or other computing resources) appropriate for the scaling cost.

The scale determiner 332 may determine a scale factor for adjusting computing resources allocated to a network application. The scale determiner 332 may provide the determined scale factor to the scaler 334, which may operate to adjust the vertical and/or horizontal scaling of the virtualized infrastructure (such as allocated hosts and/or pods) with respect to the network application. In some embodiments, a Kubernetes application program interface (API) may be called to scale up or down the computing resources allocated to the network application. In some embodiments, the scaler 332 may be configured to scale the computing resources horizontally based on resource capacity demand triggered by pod (i.e., vertical) scaling.

In some embodiments, a data structure (e.g., a lookup table or another suitable data structure) may be used to correlate a system-determined autoscaling cost to a Kubernetes pod count for a particular network application. In this manner, autoscaling may be calibrated for individual network applications. In some embodiments, computations and data may be processed at the level of granularity of a Kubernetes Namespace, Service Name and Pod. In some embodiments, the scale determiner 332 may provide the autoscaling decision (e.g., the allocation of computing resources, which may include the scale factor) to the scaler 334 as numeric value representing, for example, a number of pods and/or hosts.

Figure 4:
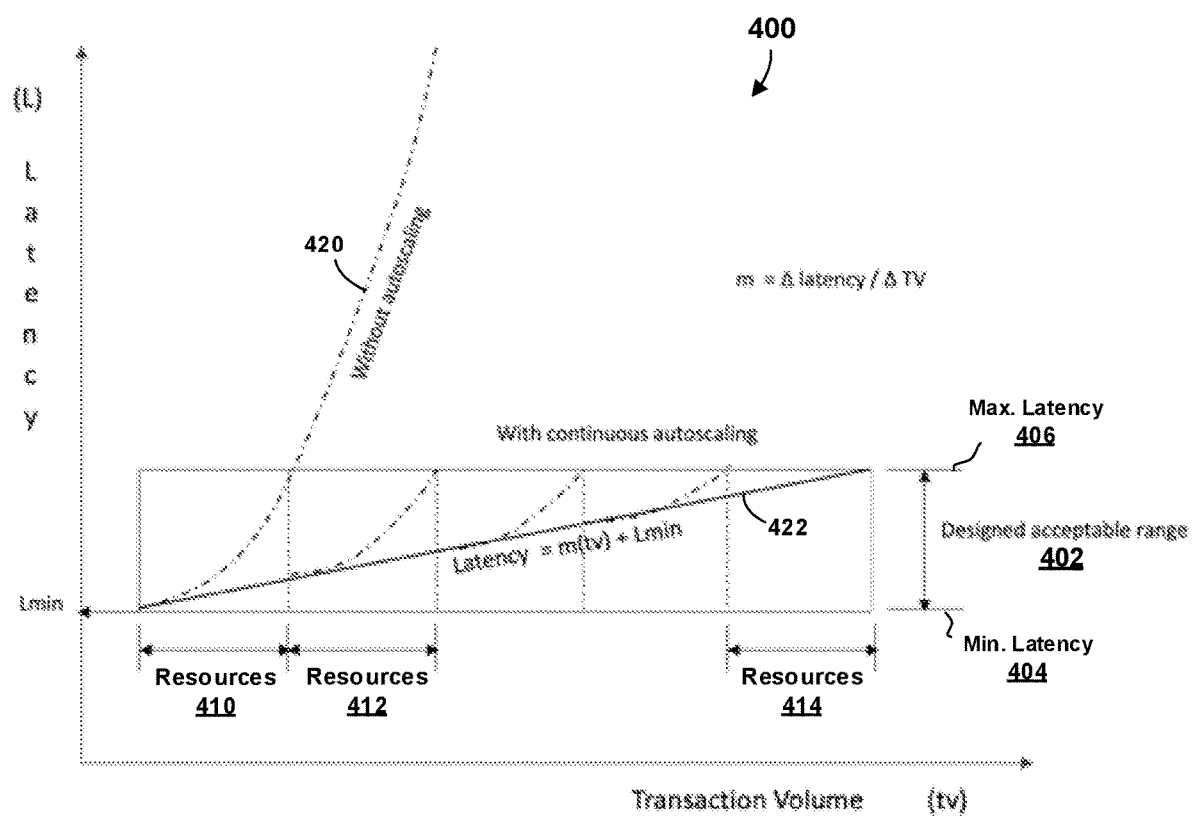
FIG. 4 illustrates a latency-transaction volume graph of an example relationship of latency and transaction volume in accordance with various embodiments.

FIG. 4 illustrates a latency-transaction volume graph 400 of an example relationship of latency and transaction volume in accordance with various embodiments. With reference to FIGS. 1-4, a network application may be run or executed by one or more processors of one or more computing devices (e.g., computing devices 110, 112, 114, 200).

The latency (which may be represented by a latency metric, L) of a network application is related to the transaction volume (which may be represented by a transaction volume metric, tv) handled by the network application. The network application may be configured to provide a level of performance within an acceptable latency range 402 between a minimum latency 404 and a maximum latency 406. Computing resources 410, 412, . . . 414 (such as hosts 306, 308, and 310, and pods 306, 308, and 310, FIG. 3) may be allocated to the network application. Conventionally, a network application may be allocated with a static amount of computing resources (e.g., resources 410) based on an analysis of past performance of the network application within the acceptable latency range 402. However, an increase in transaction volume beyond of the capability of the statically allocated computing resources (e.g., unanticipated requests to the network application) may cause latency to exceed the maximum latency 406, illustrated as latency 420.

Dynamically adding computing resources (e.g., resources 412, 414, etc.) may enable the latency of the network application to be maintained within the acceptable latency range 402 by scaling the computing resources allocated to the network application to handle additional requests made to the network application.

Application packaged as a pod (including application executable, CPU, memory, and storage) is benchmarked for a given transaction volume with pre-determined compute resources capacity. Application pod can be scaled up or down by pod count to handle the additional transaction volume to keep the latency at the normal acceptable range.

In some embodiments, the dynamic autoscaling of computing resources allocated to the network application may maintain the latency and transaction volume for a network application within a substantially linear model within the acceptable range 402. Such dynamic autoscaling may include a continuous evaluation and reevaluation of the scaling of computing resources allocated to the network application. In some embodiments, the dynamic autoscaling includes determining or predicting a scale factor for the allocation of computing resources. In some embodiments, the scale factor may include a factor applicable to hosts and/or pods allocated to the network application. In some embodiments, the scale factor may be predicted or determined as a cost difference between a best fit line of an autoscaling model and application metrics determined over time. In some embodiments, the cost difference may be represented by a delta value.

In some embodiments, an autoscaling model (for example, a supervised machine learning algorithm) may be trained to determine or predict an autoscaling cost based on the linear regression model. In some embodiments, the autoscaling cost may represent a deviation or delta of determined or trending application metrics (e.g., a latency metric and a transaction volume metric) from trained metrics (e.g., expected, anticipated, or predicted values of a latency metric and a transaction volume metric determined by the autoscaling model). In some embodiments, the autoscaling model may be trained to determine a best fit line with average latency and transaction volume per unit time, as further described below. In some embodiments, a least square error analysis may be applied in conjunction with a linear regression model (e.g., which may include gradient descent). To enable a training operation, a linear function of a plurality of latency metrics and transaction volumes may be applied to the autoscaling model to train the autoscaling model to provide the autoscaling cost as an output. In some embodiments, training data, as well as trending determined data, may be collected at the granularity of an application software instance.

In some embodiments, the latency 422 of the network application may be represented as Latency=m(tv)+Lmin, in which m represents a change in latency or with respect to transaction volume and Lmin represents a minimum latency. Thus, the latency may effectively be represented with a slope "m" and a y-intercept of Lmin. In some embodiments, the latency may represent an average latency of the network application.

Figure 5:
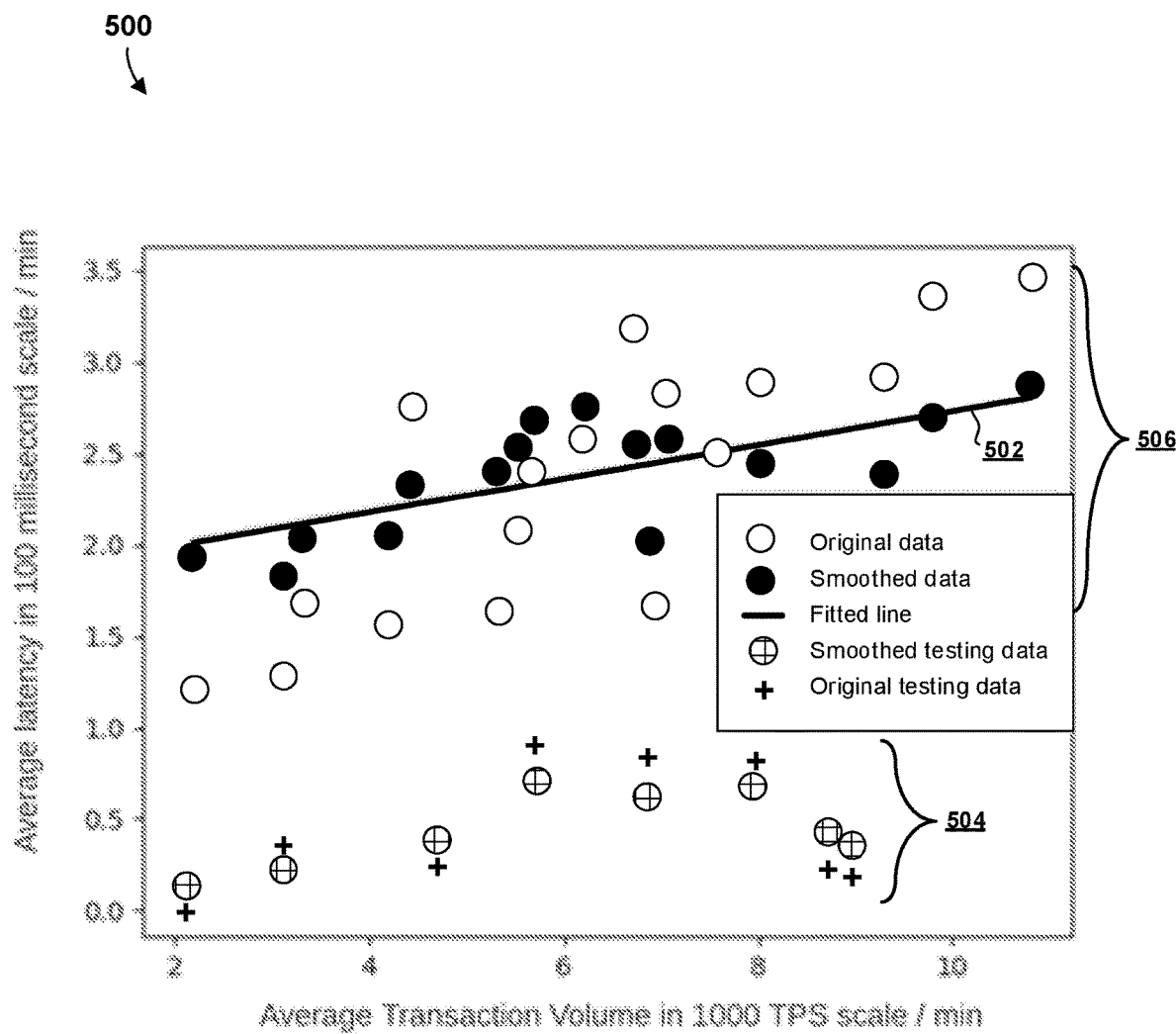
FIG. 5 illustrates an application of a smoothing filter in accordance with various embodiments.

FIG. 5 illustrates an application of a smoothing filter 500 in accordance with various embodiments. With reference to FIGS. 1-5, the smoothing filter application and related operations may be performed by one or more processors of one or more computing devices (e.g., computing devices 110, 112, 114, 200).

In some embodiments, the latency and transaction volume metrics may be influenced by environment noise such as that caused by other factors outside the context of the application under consideration. To reduce the effect of faulty metrics and avoid resource thrashing (e.g., a repetitive addition and subtraction of computing resources), a smoothing filter may be applied to latency and transaction volume metrics use in the training 504 of the autoscaling model, and to trending (e.g., detected or determined) latency and transaction volume metrics that are provided as inputs 506 to the autoscaling model. In some embodiments, the smoothing filter may include a three element triangular filter to smooth the opportunity cost per time correlated unit of comparison. In some embodiments, each latency data element may be recalculated by applying the three-element triangular filter. A best fit line 502, representing smoothed latency, illustrates an result of an application of the smoothing filter on latency and transaction volume metrics that are provided as inputs 506 to the autoscaling model. In some embodiments, smoothed latency may be represented as Smoothed Latency$_m$=$(p_{m-1}+2*p_{(m)}+p_{(m+1)})/4$, in which p represents an actual latency, and m represents a position of a data element.

Figure 6:
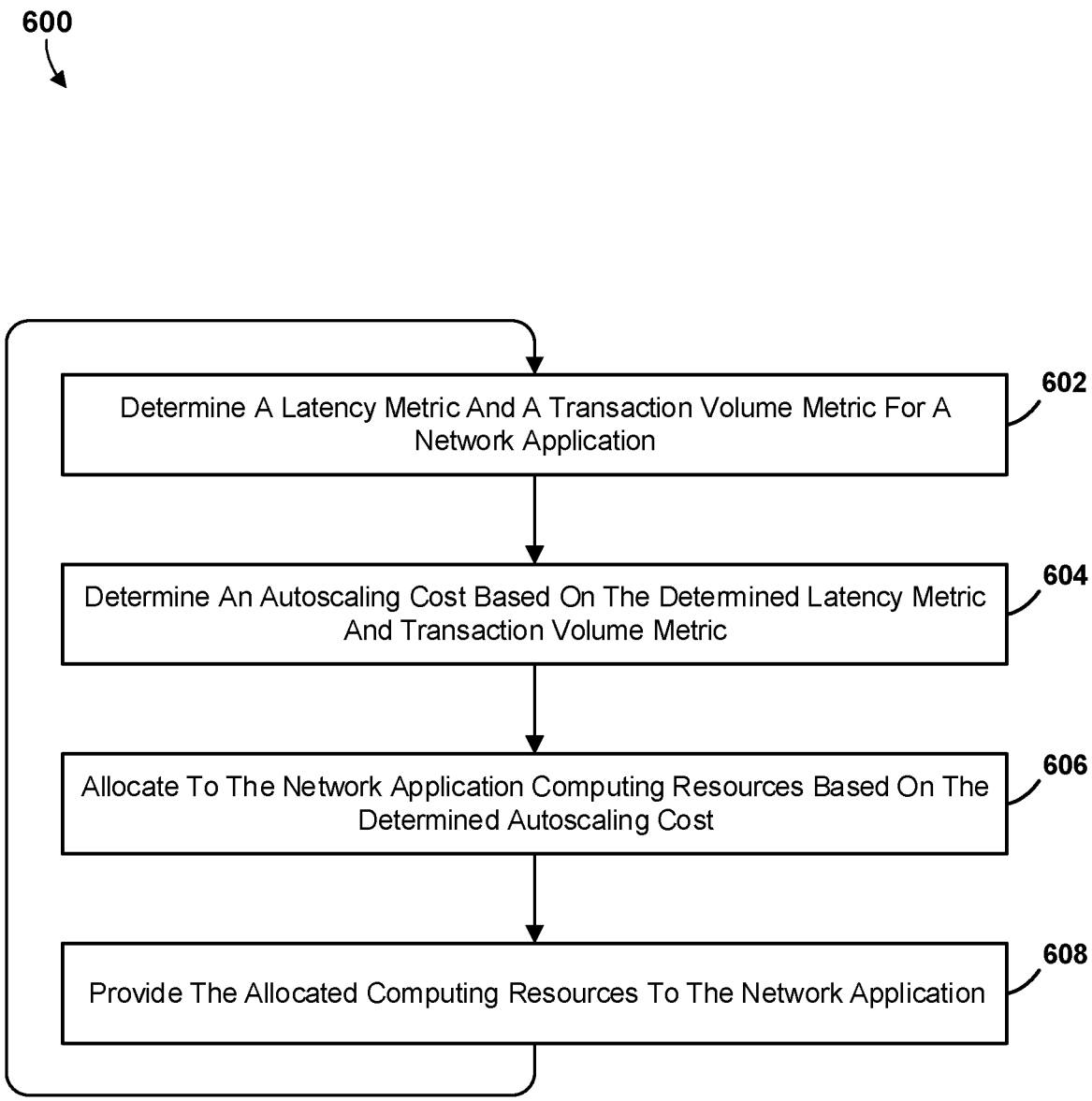
FIG. 6 is a process flow diagram illustrating a method for computing resource management according to various embodiments.

FIG. 6 is a process flow diagram illustrating a method 600 for computing resource management according to various embodiments. With reference to FIGS. 1-6, the operations of the method 600 may be implemented in hardware components and/or software components of a computing device (e.g., the computing device 110, 112, 114, 200) the operation of which may be controlled by one or more processors (e.g., the processor 201 and/or the like), referred to herein as a "processor".

In block 602, the processor may determine a latency metric and a transaction volume metric for a network application. For example, the processor may a number of transactions per second requested to be performed by the network application, and a latency representing an amount of time required for the completion of a transaction. In some embodiments, the latency metric and the transaction volume metric may average values over a period of time.

In block 604, the processor may determine an autoscaling cost based on the determined latency metric and transaction volume metric. In some embodiments, the autoscaling cost may represent a deviation or delta of determined or trending application metrics (e.g., a latency metric and a transaction volume metric) from trained latency and transaction volume metrics. In some embodiments, determining the autoscaling cost may include applying the determined latency metric and transaction volume metric to an autoscaling model that provides as an output the autoscaling cost.

In block 606, the processor may allocate to the network application computing resources based on the determined autoscaling cost. In some embodiments, the processor may allocate one or more hosts, and/or one or more pods within a host to the network application.

In block 608, the processor may provide the allocated computing resources to the network application. In some embodiments, the processor may configure the allocated resource(s) to perform one or more operations related to the network application.

The processor may iteratively perform the operations of blocks 602-608 from time to time. In this manner, the processor may dynamically scale the computing resources allocated to the network application.

FIGS. 7A-7D illustrate process flow diagrams of operations 700a-700d that may be performed as part of the method 600 of computing resource management according to various embodiments. With reference to FIGS. 1-7D, the operations 700a-700d may be implemented in hardware components and/or software components of a computing device (e.g., the computing device 110) the operation of which may be controlled by one or more processors (e.g., the processor 201 and/or the like).

Figure 7A:
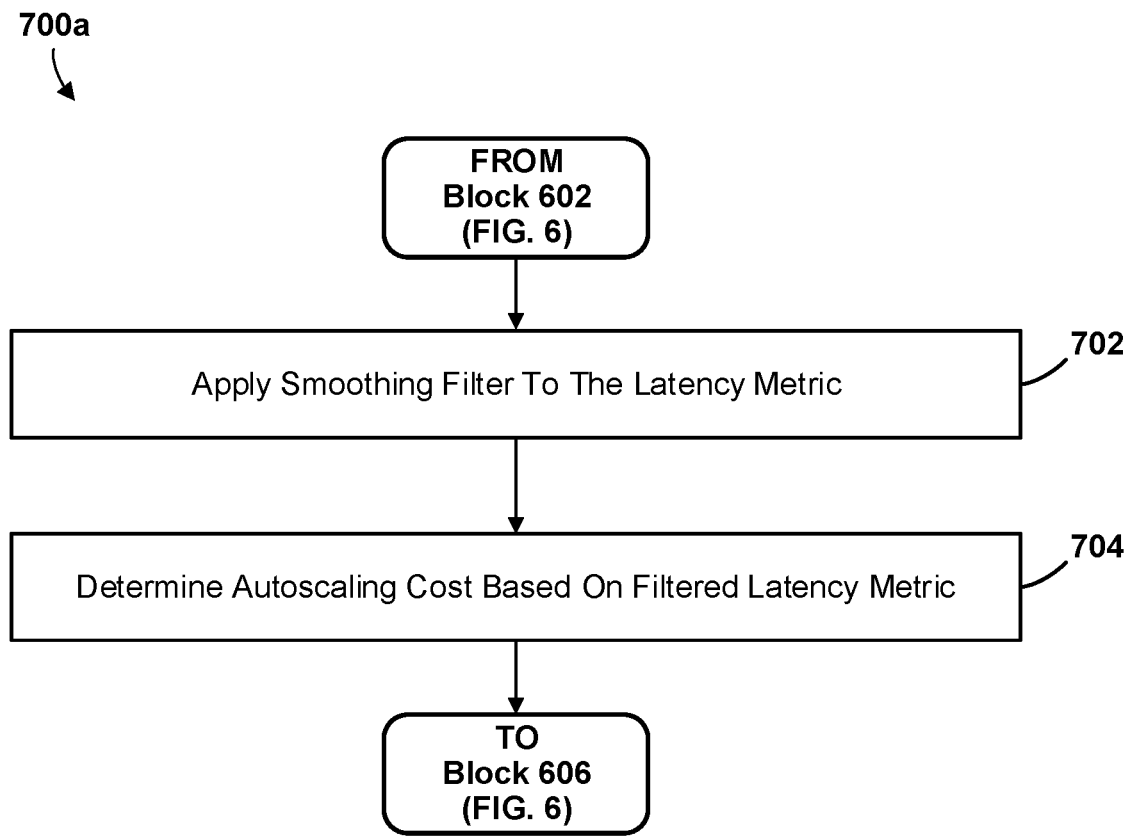
FIGS. 7A-7D illustrate process flow diagrams of operations that may be performed as part of the method of computing resource management according to various embodiments.

With reference to FIG. 7A, following the performance of the operations of block 602 (FIG. 6), the processor may apply a smoothing filter to the latency metric in block 702.

In block 704, the processor may determine the autoscaling cost based on the filtered latency metric.

The processor may then proceed to perform the operations of block 606 (FIG. 6).

Figure 7B:
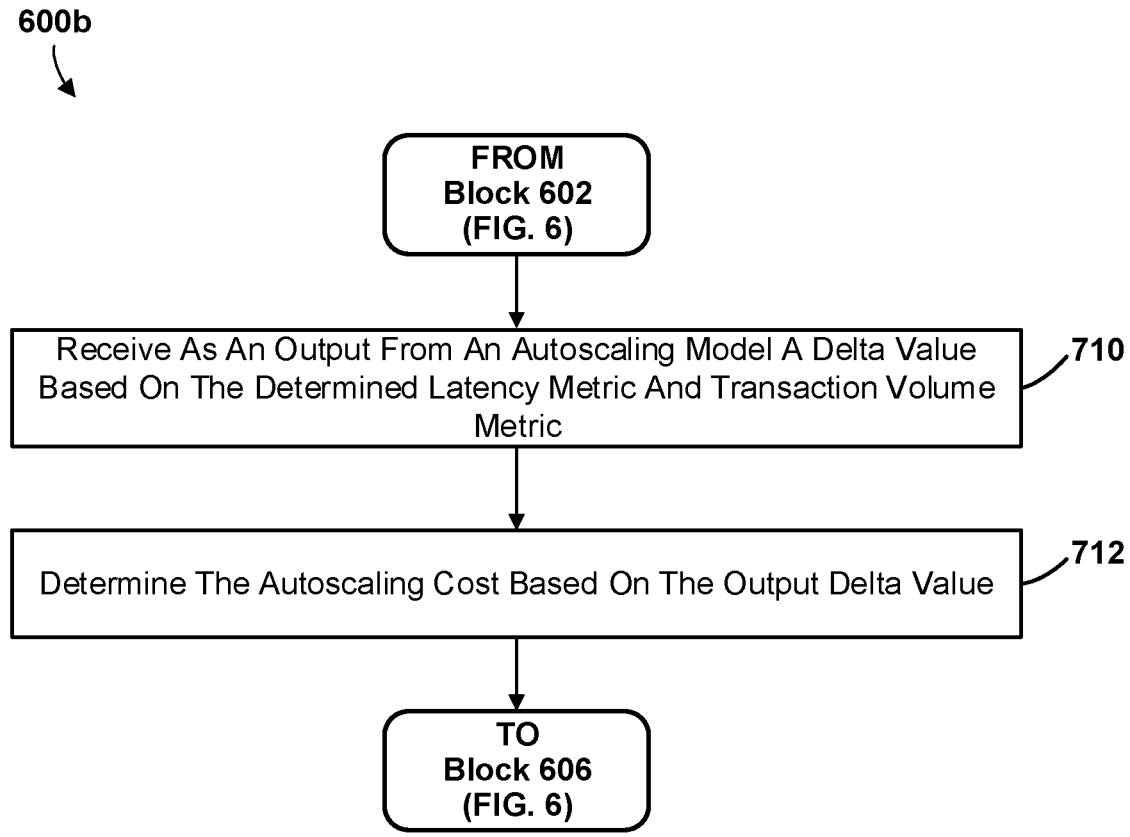

With reference to FIG. 7B, following the performance of the operations of block 602 (FIG. 6), the processor may receive as an output from an autoscaling model a delta value based on the determined latency metric and transaction volume metric in block 710. In some embodiments, the delta value may represent a cost difference between a best fit line of an autoscaling model and application metrics determined over time.

In block 712, the processor may determine the autoscaling cost based on the output delta value.

The processor may then proceed to perform the operations of block 606 (FIG. 6).

Figure 7C:
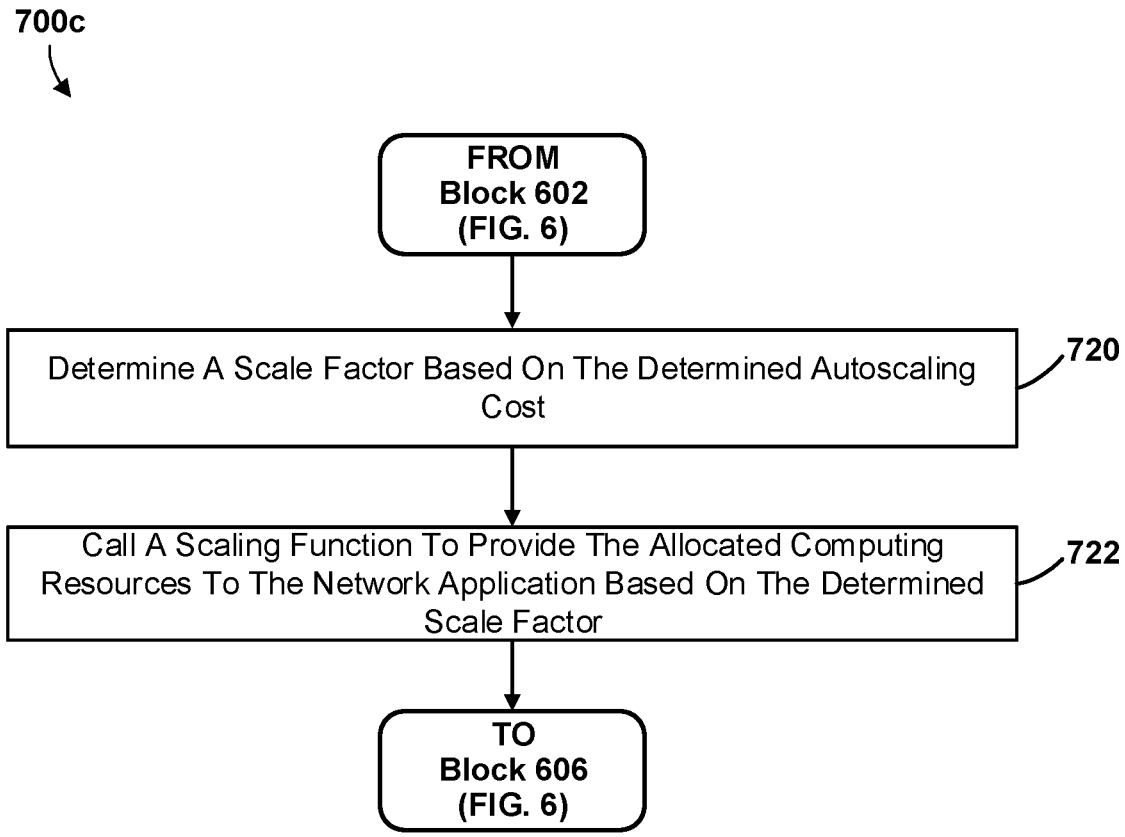

With reference to FIG. 7C, following the performance of the operations of block 602 (FIG. 6), the processor may determine a scale factor based on the determined autoscaling cost in block 720.

In block 722, the processor may call a scaling function to provide the allocated computing resources to the network application based on the determined scale factor.

The processor may then proceed to perform the operations of block 606 (FIG. 6).

Figure 7D:
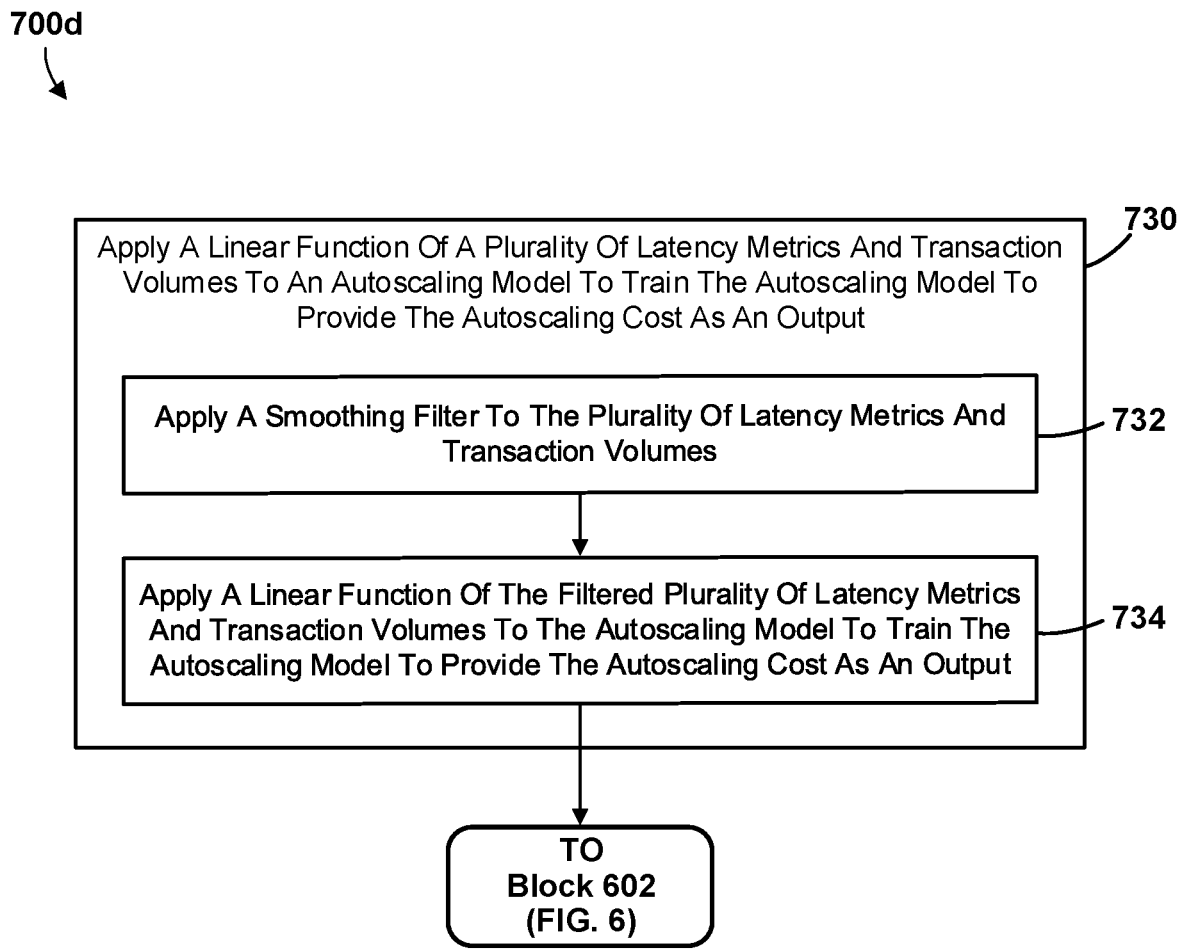

With reference to FIG. 7D, the processor may perform a training operation to train the autoscaling model.

In block 730, during a training operation, the processor may apply a linear function of a plurality of latency metrics and transaction volumes to an autoscaling model to train the autoscaling model to provide the autoscaling cost as an output.

As part of the operations of block 730, in some embodiments, the processor may apply a smoothing filter to the plurality of latency metrics and transaction volumes in block 732.

In block 734, the processor may apply a linear function of the filtered plurality of latency metrics and transaction volumes to the autoscaling model to train the autoscaling model to provide the autoscaling cost as an output.

The processor may then proceed to perform the operations of block 602 (FIG. 6).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations methods and operations 600 and 700a-700d may be substituted for or combined with one or more operations of the methods 600 and 700a-700d and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a network computing device for computing resource management, comprising:
   determining a latency metric and a transaction volume metric for a network application;
   determining an autoscaling cost based on a deviation of the determined latency metric from a predicted latency metric and a deviation of the transaction volume metric from a predicted transaction volume metric;
   allocating computing resources to the network application based on the determined autoscaling cost; and
   providing the allocated computing resources to the network application.

2. The method of claim 1, further comprising:
   applying a smoothing filter to the latency metric;
   wherein determining the autoscaling cost based on the deviation of the determined latency metric from the predicted latency metric and the deviation of the transaction volume metric from the predicted transaction volume metric comprises determining the autoscaling cost based on the filtered latency metric.

3. The method of claim 1, wherein determining the autoscaling cost based on the deviation of the determined latency metric from the predicted latency metric and the deviation of the transaction volume metric from the predicted transaction volume metric comprises applying the determined latency metric and the transaction volume metric to an autoscaling model that provides as an output the autoscaling cost.

4. The method of claim 1, wherein determining the autoscaling cost based on the deviation of the determined latency metric from the predicted latency metric and the deviation of the transaction volume metric from the predicted transaction volume metric comprises:
receiving as an output from an autoscaling model a delta value based on the determined latency metric and the transaction volume metric; and
determining the autoscaling cost based on the output delta value.

5. The method of claim 4, wherein the delta value represents a change in the latency metric over time.

6. The method of claim 1, wherein providing the allocated computing resources to the network application comprises:
determining a scale factor based on the determined autoscaling cost; and
calling a scaling function to provide the allocated computing resources to the network application based on the determined scale factor.

7. The method of claim 1, further comprising:
during a training operation, applying a linear function of a plurality of latency metrics and transaction volumes to the autoscaling model to train the autoscaling model to provide the autoscaling cost as an output.

8. The method of claim 7, wherein applying the linear function of the plurality of latency metrics and transaction volumes to the autoscaling model comprises:
applying a smoothing filter to the plurality of latency metrics and transaction volumes; and
applying the linear function of the filtered plurality of latency metrics and transaction volumes to the autoscaling model to train the autoscaling model to provide the autoscaling cost as the output.

9. A network computing device, comprising:
a processor coupled to a memory and configured with processor-executable instructions to perform operations comprising:
determining a latency metric and a transaction volume metric for a network application;
determining an autoscaling cost based on a deviation of the determined latency metric from a predicted latency metric and a deviation of the transaction volume metric from a predicted transaction volume metric;
allocating computing resources to the network application based on the determined autoscaling cost; and
providing the allocated computing resources to the network application.

10. The network computing device of claim 9, wherein the processor is configured with processor-executable instructions to perform operations further comprising:
applying a smoothing filter to the latency metric;
wherein determining the autoscaling cost based on the deviation of the determined latency metric from the predicted latency metric and the deviation of the transaction volume metric from the predicted transaction volume metric comprises determining the autoscaling cost based on the filtered latency metric.

11. The network computing device of claim 9, wherein the processor is configured with processor-executable instructions to perform operations such that determining the autoscaling cost based on the deviation of the determined latency metric from the predicted latency metric and the deviation of the transaction volume metric from the predicted transaction volume metric comprises applying the determined latency metric and the transaction volume metric to an autoscaling model that provides as an output the autoscaling cost.

12. The network computing device of claim 9, wherein the processor is configured with processor-executable instructions to perform operations such that determining the autoscaling cost based on the deviation of the determined latency metric from the predicted latency metric and the deviation of the transaction volume metric from the predicted transaction volume metric comprises:
receiving as an output from an autoscaling model a delta value based on the determined latency metric and the transaction volume metric; and
determining the autoscaling cost based on the output delta value.

13. The network computing device of claim 12, wherein the processor is configured with processor-executable instructions to perform operations such that, wherein the delta value represents a change in the latency metric over time.

14. The network computing device of claim 9, wherein the processor is configured with processor-executable instructions to perform operations such that providing the allocated computing resources to the network application comprises:
determining a scale factor based on the determined autoscaling cost; and
calling a scaling function to provide the allocated computing resources to the network application based on the determined scale factor.

15. The network computing device of claim 9, wherein the processor is configured with processor-executable instructions to perform operations further comprising:
during a training operation, applying a linear function of a plurality of latency metrics and transaction volumes to an autoscaling model to train the autoscaling model to provide the autoscaling cost as an output.

16. The network computing device of claim 15, wherein the processor is configured with processor-executable instructions to perform operations such that applying the linear function of the plurality of latency metrics and transaction volumes to the autoscaling model comprises:
applying a smoothing filter to the plurality of latency metrics and transaction volumes; and
applying the linear function of the filtered plurality of latency metrics and transaction volumes to the autoscaling model to train the autoscaling model to provide the autoscaling cost as the output.

17. A non-transitory processor-readable medium having stored thereon processor-executable instruction configured to cause a processor of a network computing device to perform operations comprising:
determining a latency metric and a transaction volume metric for a network application;
determining an autoscaling cost based on a deviation of the determined latency metric from a predicted latency metric and the deviation of the transaction volume metric from a predicted transaction volume metric;

allocating computing resources to the network application based on the determined autoscaling cost; and providing the allocated computing resources to the network application.

18. The non-transitory processor-readable medium of claim 17, wherein the stored processor-executable instructions are configured to cause a processor of a network computing device to perform operations further comprising:

applying a smoothing filter to the latency metric;

wherein determining the autoscaling cost based on the deviation of the determined latency metric from the predicted latency metric and the deviation of the transaction volume metric from the predicted transaction volume metric comprises determining the autoscaling cost based on the filtered latency metric.

19. The non-transitory processor-readable medium of claim 17, wherein the stored processor-executable instructions are configured to cause a processor of a network computing device to perform operations such that determining the autoscaling cost based on the deviation of the determined latency metric from the predicted latency metric and the deviation of the transaction volume metric from the predicted transaction volume metric comprises applying the determined latency metric and the transaction volume metric to an autoscaling model that provides as an output the autoscaling cost.

20. The non-transitory processor-readable medium of claim 17, wherein the stored processor-executable instructions are configured to cause a processor of a network computing device to perform operations such that determining the autoscaling cost based on the deviation of the determined latency metric from the predicted latency metric and the deviation of the transaction volume metric from the predicted transaction volume metric comprises:

receiving as an output from an autoscaling model a delta value based on the determined latency metric and the transaction volume metric; and determining the autoscaling cost based on the output delta value.

21. The non-transitory processor-readable medium of claim 20, wherein the stored processor-executable instructions are configured to cause a processor of a network computing device to perform operations such that the delta value represents a change in the latency metric over time.

22. The non-transitory processor-readable medium of claim 17, wherein the stored processor-executable instructions are configured to cause a processor of a network computing device to perform operations such that providing the allocated computing resources to the network application comprises:

determining a scale factor based on the determined autoscaling cost; and calling a scaling function to provide the allocated computing resources to the network application based on the determined scale factor.

23. The non-transitory processor-readable medium of claim 17, wherein the stored processor-executable instructions are configured to cause a processor of a network computing device to perform operations further comprising:

during a training operation, applying a linear function of a plurality of latency metrics and transaction volumes to an autoscaling model to train the autoscaling model to provide the autoscaling cost as an output.

24. The non-transitory processor-readable medium of claim 23, wherein the stored processor-executable instructions are configured to cause a processor of a network computing device to perform operations such that applying the linear function of the plurality of latency metrics and transaction volumes to the autoscaling model comprises:

applying a smoothing filter to the plurality of latency metrics and transaction volumes; and applying the linear function of the filtered plurality of latency metrics and transaction volumes to the autoscaling model to train the autoscaling model to provide the autoscaling cost as the output.

* * * * *